(12) United States Patent
Jiang et al.

(10) Patent No.: US 9,619,024 B2
(45) Date of Patent: Apr. 11, 2017

(54) VIRTUAL INPUT DEVICE AND VIRTUAL INPUT METHOD

(71) Applicant: Beijing TransBorder Information Technology Co., Ltd., Beijing (CN)

(72) Inventors: Xiaodan Jiang, Beijing (CN); Qin Liu, Beijing (CN); Yongzhen He, Beijing (CN)

(73) Assignee: BEIJING TRANSBORDER INFORMATION TECHNOLOGY CO., LTD., Beijing (CN)

( * ) Notice: Subject to any disclaimer, the term of this patent is extended or adjusted under 35 U.S.C. 154(b) by 4 days.

(21) Appl. No.: 14/748,557

(22) Filed: Jun. 24, 2015

(65) Prior Publication Data

US 2015/0370327 A1    Dec. 24, 2015

(30) Foreign Application Priority Data

Jun. 24, 2014  (CN) .......................... 2014 1 0289043
Jun. 24, 2014  (CN) .......................... 2014 1 0289073

(51) Int. Cl.
*G09G 5/00* (2006.01)
*G06F 3/01* (2006.01)
*G06F 3/0346* (2013.01)
*G06K 9/00* (2006.01)

(52) U.S. Cl.
CPC .............. *G06F 3/015* (2013.01); *G06F 3/014* (2013.01); *G06F 3/017* (2013.01); *G06F 3/0346* (2013.01); *G06K 9/00335* (2013.01)

(58) Field of Classification Search
CPC .......... G06F 3/015; G06F 3/017; G06F 3/014; G06F 3/0346; G06K 9/00335
USPC ...................... 345/156–158, 169; 341/20–22
See application file for complete search history.

(56) References Cited

U.S. PATENT DOCUMENTS 6,380,923 B1 *  4/2002  Fukumoto ............... G06F 1/163
                                                      341/22
2014/0176439 A1 *  6/2014  Keller ................... G06F 3/0346
                                                      345/159

* cited by examiner

*Primary Examiner* — Jennifer Nguyen
(74) *Attorney, Agent, or Firm* — Flener IP Law, LLC; Zareefa B Flener

(57) ABSTRACT

A virtual inputting device comprises: a signal collection unit including a bioelectrical sensor for collecting bioelectrical signals and an acceleration sensor for collecting acceleration signals; a signal preprocessing unit for performing preprocessing for the bioelectrical signals and the acceleration signals collected by the signal collection unit; a signal segmentation unit for performing segmentation processing for the preprocessed bioelectrical signals and acceleration signals so as to obtain a plurality of gesture segments; a feature extracting unit for extracting feature values from the bioelectrical signals and the acceleration signals for respective gesture segments; a feature combination unit for combining feature values extracted from the feature extracting unit to form a combined feature vector; a gesture recognition unit for performing gesture recognition based on the combined feature vector; and a character mapping unit for obtaining characters corresponding to the recognized gesture according to a predetermined mapping relationship between characters and gestures.

19 Claims, 4 Drawing Sheets

VIRTUAL INPUT DEVICE AND VIRTUAL INPUT METHOD

CROSS-REFERENCE TO RELATED APPLICATIONS

This application claims the benefit and priority of Chinese patent application No. 201410289043.6 filed on Jun. 24, 2014 and Chinese patent application No. 201410289073.7 filed on Jun. 24, 2014. Both of these applications are incorporated herein in their entirety by reference.

TECHNICAL FIELD

The disclosed embodiments relate to a virtual input device and a virtual input method.

BACKGROUND

Gesture is widely used in daily life of people as a common communication way. With rapid development of computer technology in recent years, research on gesture recognition to introduce gesture into man-machine interfaces has drawn great attraction and made great progresses.

As conventional man-machine interactive input devices, keyboards play an important role. The common keyboards nowadays include physical hardware keyboards and touch-screen soft keyboards. However, due to the limitation of size, the two kinds of keyboards cannot provide both portability and ease of operation. In view of this, virtual input devices have been proposed.

The existing virtual keyboards typically use projection of keyboard to form a desired keyboard image by using light projection when needed, and use a single camera to acquire images of a user's input actions, and then recognize images to obtain input results. However, due to use of light and camera, such virtual keyboards are not convenient to use and carry.

In view of this, there is a requirement to provide a virtual input device which is easy to use and carry.

SUMMARY

Embodiments of the present invention are directed to a virtual input device which is easy to use and carry.

Embodiments of the present invention are also directed to a virtual input method corresponding to the virtual input device.

According to one or more embodiments, a virtual inputting device comprises: a signal collection unit including a bioelectrical sensor for collecting bioelectrical signals and an acceleration sensor for collecting acceleration signals, the bioelectrical signals and the acceleration signals reflecting a user's gesture; a signal preprocessing unit for performing preprocessing for the bioelectrical signals and the acceleration signals collected by the signal collection unit; a signal segmentation unit for performing segmentation processing for the preprocessed bioelectrical signals and acceleration signals so as to obtain a plurality of gesture segments; a feature extracting unit for extracting feature values from the bioelectrical signals and the acceleration signals for respective gesture segments; a feature combination unit for combining feature values extracted from the feature extracting unit to form a combined feature vector; a gesture recognition unit for performing gesture recognition based on the combined feature vector; and a character mapping unit for obtaining characters corresponding to the recognized gesture according to a predetermined mapping relationship between characters and gestures.

The device may further comprise a sending unit for sending the characters corresponding to the recognized gesture to an external device. The sending unit may send the characters corresponding to the recognized gesture to the external device using a wireless communication method.

The bioelectrical sensor may be disposed inside a wrist band, and the acceleration sensor may be disposed in a thumb ring. The bioelectrical sensor may comprise a plurality of myoelectricity signal probes and a plurality of impedance signal probes.

The preprocessing may comprise band-pass filtering for the bioelectrical signals, low pass filtering for the acceleration signals, and analog to digital conversion for the bioelectrical signals and the acceleration signals.

The segmentation processing may comprise: determining starting points and ending points for the preprocessed bioelectrical signals and the preprocessed acceleration signals respectively; and averaging the starting points so as to obtain a starting point of a gesture segment, and averaging the ending points so as to obtain an ending point of the gesture segment. Determining starting points and ending points may comprise: obtaining a baseline using a multiple point moving average filter; subtracting the baseline from the original preprocessed signals to obtain steady signals; obtaining inside window energy of the steady signals using a time window having a fixed width; normalizing energy magnitudes; comparing the normalized energy magnitudes with a predefined threshold; and determining the staring points and the ending points based on comparing result.

The feature extracting unit may combine multi-channel bioelectrical signals to form an multi-dimensional feature vector, and calculate speed changes in each axis of a three-dimensional space for the acceleration signals to form a three-dimensional feature vector; the feature combination unit may combine all above features to form a combined feature vector.

Alternatively, the feature extracting unit may combine multi-channel bioelectrical signals to form a multi-dimensional feature vector, and calculate amplitude average values of acceleration in each axis of a three-dimensional space plus resultant acceleration for the acceleration signals to form a four-dimensional feature vector; the feature combination unit may combine all above features to form a combined feature vector.

The mapping relationship between characters and recognized gesture result may be a Morse code table.

Alternatively, the mapping relationship between characters and recognized gesture result may be a mapping relationship between characters and different parts of four fingers except thumb. The device may further comprise a character set switching unit for switching the recognized gesture to another set of characters.

According to one or more embodiments, a virtual inputting method comprises: collecting bioelectrical signals and acceleration signals reflecting a user's gesture; performing preprocessing for the collected bioelectrical signals and the collected acceleration signals; performing segmentation processing for the preprocessed bioelectrical signals and the preprocessed acceleration signals so as to obtain a plurality of gesture segments; extracting feature values from the bioelectrical signals and the acceleration signals for respective gesture segments; combining the extracted feature values to form a combined feature vector; performing gesture recognition based on the combined feature vector; and obtaining characters corresponding to the recognized gesture according to a predetermined mapping relationship between characters and gestures.

The method may further comprise sending the characters corresponding to the recognized gesture to an external device. A wireless communication method may be used to send the characters corresponding to the recognized gesture to the external device.

The bioelectrical signals may comprise a plurality of myoelectricity signals and a plurality of impedance signals.

The mapping relationship between characters and recognized gesture result may be a Morse code table.

Alternatively, the mapping relationship between characters and recognized gesture result may be a mapping relationship between characters and different parts of four fingers except thumb. The method may further comprise switching the recognized gesture to another set of characters.

With this virtual input device and this virtual input method, signals are collected by two sensors respectively disposed inside a wrist band and a thumb ring, rather than by light projection and cameras. Since the wrist band and thumb ring are easy to use and carry, the virtual input device and the virtual input method provide both portability and usability.

In addition, the bioelectrical signals collect myoelectricity signals under the skin and impedance change signals of the skin surface. These bioelectrical signals reflect rich movement information of different muscle groups relating to the gesture. With these bioelectrical signals, fine movements of fingers, palm and wrist can be recognized. The acceleration sensor disposed at the thumb collect acceleration signals which can reflect movement of an arm and is good at distinguishing large-scale movements. Thus combination of bioelectrical signals and acceleration signals can expand the kinds of gesture which is capable being recognized and distinguish fine differences between different gestures, thereby improving recognition accuracy greatly.

BRIEF DESCRIPTION OF DRAWINGS

These and other aspects will become apparent and more readily appreciated from the following description of the embodiments, taken in conjunction with the accompanying drawings in which.

DETAILED DESCRIPTION

Figure 1:
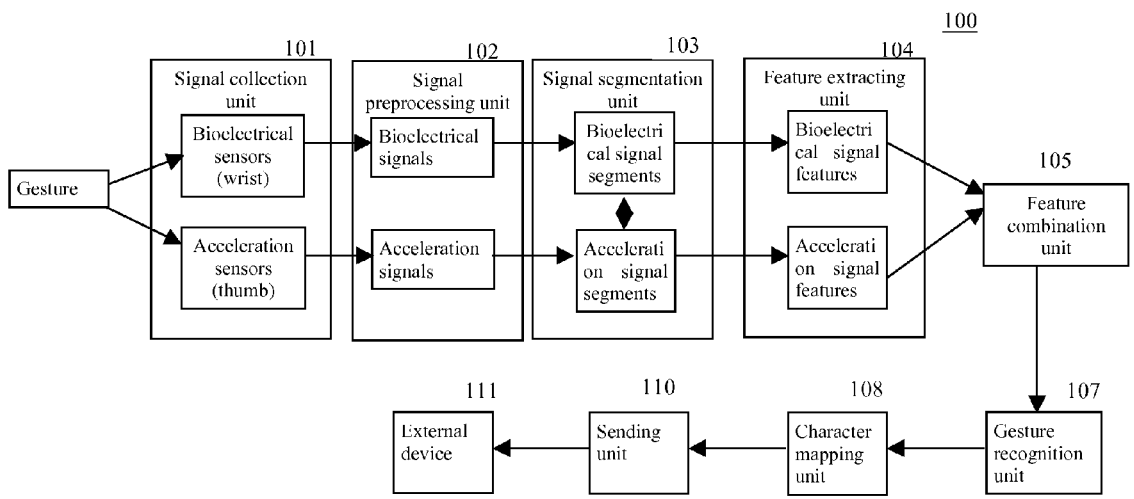
FIG. 1 illustrates schematic structure of a virtual input device according to an embodiment of the present invention.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

FIG. 1 illustrates schematic structure of a virtual input device according to an embodiment of the present invention.

As shown in FIG. 1, a virtual input device 100 according to an embodiment includes a signal collection unit 101, a signal preprocessing unit 102, a signal segmentation unit 103, a feature extracting unit 104, a feature combination unit 105, a gesture recognition unit 107 and a character mapping unit 108.

Figure 2:
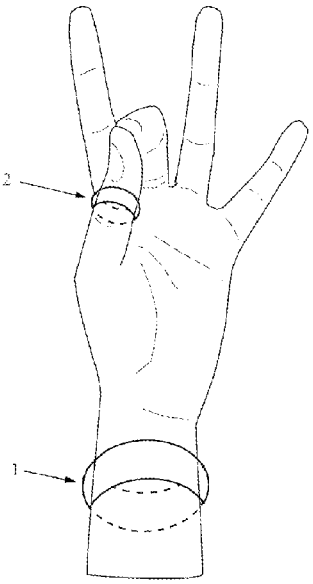
FIG. 2 illustrates the installation locations of sensors according to an embodiment of the present invention.

The signal collection unit 101 includes a bioelectrical sensor disposed inside a wrist band 1 and an acceleration sensor disposed inside a thumb ring 2 as shown in FIG. 2. The bioelectrical sensor collects bioelectrical signals indicating tension level of muscle groups relating to a user's gesture, and the acceleration sensor collects acceleration signals indicating track and acceleration of movement of the user's thumb.

The signal preprocessing unit 102 performs preprocessing for the bioelectrical signals and acceleration signals collected by the signal collection unit 101. For example, the preprocessing includes noise deduction processing, filtering processing and analog to digital conversion.

The signal segmentation unit 103 performs segmentation processing for the preprocessed bioelectrical signals and the preprocessed acceleration signals so as to obtain a plurality of gesture segments.

The feature extracting unit 104 extracts feature values from the bioelectrical signals and the acceleration signals for respective gesture segments.

The feature combination unit 105 combines feature values extracted from the feature extracting unit 104.

The gesture recognition unit 107 performs gesture recognition based on the combined feature vector, so as to recognize the gesture of the user.

The character mapping unit 108 obtains characters corresponding to the recognized gesture of the user according to a predetermined mapping relationship between characters and gestures.

The virtual input device 100 may further comprise a sending unit 110. The sending unit 110 may send the characters corresponding to the recognized gesture of the user to an external device 111 through a wireless communication method, such as Bluetooth or WIFI, so as to realize virtual input of characters.

With this virtual input device, signals are collected by two sensors respectively disposed inside a wrist band and a thumb ring, rather than by light projection and cameras. Since the wrist band and thumb ring are easy to use and carry, the virtual input device according to an embodiment of the present invention provides both portability and usability.

Figures 3, 4:
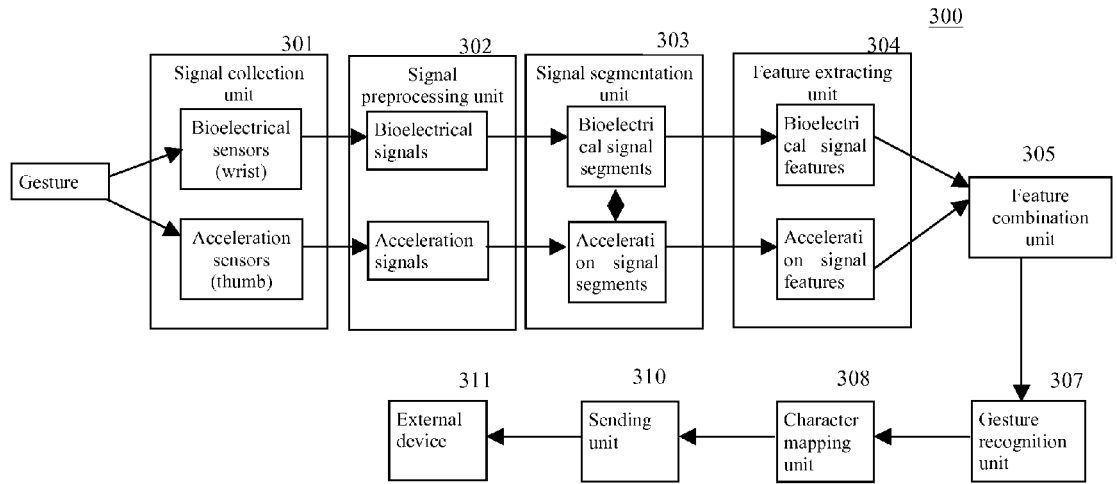
FIG. 3 illustrates schematic structure of a virtual input device according to another embodiment of the present invention.
FIG. 4 illustrates a Morse code table.

FIG. 3 illustrates schematic structure of a virtual input device according to another embodiment of the present invention, which is especially designed to input Morse codes.

Morse codes are consisted of two basic signals and different time intervals: short point signal ".", long signal "-", and intervals of 1t, 3t, and 5t etc. Based on the basic signals and different time intervals, English characters A-Z, digitals 0-9 and some common characters such as "?", "/", "( )" etc. can be defined. A sender translates the contents to be sent to Morse codes according to a predetermined Morse code table, e.g. as shown in FIG. 4, and sends the translated codes to a recipient through common keyboards or specialized devices. The recipient translates back the received codes to the contents according to the same Morse code table.

As shown in FIG. 3, a virtual input device 300 for inputting Morse codes includes a signal collection unit 301, a signal preprocessing unit 302, a signal segmentation unit 303, a feature extracting unit 304, a feature combination unit 305, a gesture recognition unit 307 and a character mapping unit 308.

The signal collection unit 301 includes a bioelectrical sensor disposed inside a wrist band 1 and an acceleration sensor disposed inside a thumb ring 2 as shown in FIG. 2. The bioelectrical sensor collects bioelectrical signals indicating tension level of muscle groups relating to a user's gesture, and the acceleration sensor collects acceleration signals indicating track and acceleration of movement of the user's thumb.

In detail, the bioelectrical sensor disposed in the wrist band 1 is used to identify gestures of hands, for example whether the thumb is contacted with or separated from one of the other four fingers. Thereinafter forefinger will be taken as an example, however this invention is not limited thereto. The two gestures, i.e., the thumb being contacted with the forefinger and the thumb being separated from the forefinger, cause different shapes of the hand, so the tension levels of related muscle groups are different. The bioelectrical sensor can be placed on skin of wrist of the user, and can include a plurality of sensor probes, e.g., myoelectricity signal probes and impedance signal probes, so as to obtain bioelectrical signals of gestures, e.g., myoelectricity signals under the skin and impedance change signals of the skin surface.

The acceleration sensor disposed in the thumb ring 2 is used to collect movement track of the user's thumb in the three-dimensional space, as well as liner displacement acceleration and angular displacement acceleration in each of the three axes, i.e., X, Y and Z. In this embodiment, the acceleration sensor is used to identify contacting time between the thumb and the forefinger. For a short contact, the speed change of the thumb in three axes is large, and in contrast, for a long contact, the speed change of the thumb in three axes is small. So by collecting acceleration of the thumb in three axes, whether the contact between the thumb and the forefinger is a long contact or a short contact can be determined.

The signal preprocessing unit 302 performs preprocessing for the bioelectrical signals and the acceleration signals collected by the signal collection unit 301.

In detail, the signal preprocessing unit 302 performs band-pass filtering for the bioelectrical signals, and performs low pass filtering for the acceleration signals, so as to eliminate the effects of environmental noise and other factors. Then the bioelectrical signals and the acceleration signals are performed analog to digital conversion with 500-1000 Hz as sampling rate, so as to obtain discrete digital bioelectrical signals and digital acceleration signals, i.e., preprocessed bioelectrical signals and acceleration signals.

The signal segmentation unit 303 performs segmentation processing for the preprocessed bioelectrical signals and acceleration signals so as to obtain a plurality of gesture segments.

In detail, for preprocessed bioelectrical signals, a baseline is obtained by using a multiple point moving average filter. Steady signals without low frequency drift are obtained by subtracting the baseline from the original preprocessed signals. Then inside window energy of the steady signals is obtained by using a time window having a fixed width. Thereafter, the energy magnitudes are normalized, i.e. the absolute values of the signals are changed to relative values between 0-1. A threshold is set. If there are a plurality of continuous sampling points of the signal energy which is above this threshold, a starting point of a gesture segment can be determined. And if there are a plurality of continuous sampling points of the signal energy which is below this threshold, an ending point of the gesture segment can be determined. By determining the starting point and the ending point, a gesture segment can be obtained.

For preprocessed acceleration signals, a starting point and an ending point are determined in a manner similar to the above-mentioned manner for the bioelectrical signals. Then, the two starting points and the two ending points are compared and averaged respectively, so as to complete division of gesture active segments.

The feature extracting unit 304 extracts feature values from the bioelectrical signals and the acceleration signals for respective gesture segments.

In detail, for the bioelectrical signals in a segment, energy amplitudes of multi-channel bioelectrical signals collected by multiple bioelectrical sensor probes disposed in the wrist band 1 are combined to form a multi-dimensional vector. The multi-dimensional vector serves as a bioelectrical signal feature value which is used to judge whether the thumb is contacted with or separated from the forefinger.

For the acceleration signals in the segment, speed changes in the three axes X, Y and Z are calculated to obtain a three-dimensional acceleration feature vector. When the thumb contacts different fingers or different parts of a same finger, the space movement tracks and acceleration in the three axes of the thumb are different, so the contacting time between the thumb and the forefinger can be determined by identifying the acceleration in the three axes of the thumb. For example, the acceleration is relatively large for a short contact while it is relatively small for a long contact.

The feature combination unit 305 combines feature values, i.e., the multi-dimensional feature vector obtained for the bioelectrical signals and the three-dimensional feature value obtained for the acceleration signals, extracted from the feature extracting unit 304.

The gesture recognition unit 307 performs gesture recognition based on the combined feature vector, so as to recognize the gesture of the user.

In detail, based on the combined feature vector, the gesture recognition unit 307 judges whether the thumb contacted with or separated from the forefinger according to the bioelectrical feature vector, and determines contacting time between the thumb and the forefinger according to the acceleration feature vector. Large acceleration which means short contact, small acceleration which means long contact, and separation of the thumb from the forefinger corresponds to short code, long code and space key of the Morse codes respectively.

The character mapping unit 308 obtains characters corresponding to the recognized gesture of the user according to a predetermined mapping relationship between characters and the recognized gesture result, for example according to the Morse code table shown in FIG. 4.

The virtual input device 300 may further comprise a sending unit 310. The sending unit 310 may send the characters corresponding to the recognized gesture of the user to an external device 311 through a wireless communication method, such as Bluetooth or WIFI, so as to realize virtual input of characters.

With this virtual input device, signals are collected by two sensors respectively disposed inside a wrist band and a thumb ring, and Morse codes are obtained by recognizing the collected signals. Thus there is no need of a physical keyboard nor a specialized device to send Morse codes. Since the wrist band and thumb ring are easy to use and carry, the virtual input device to input Morse codes according to this embodiment provides both portability and usability.

Figure 5:
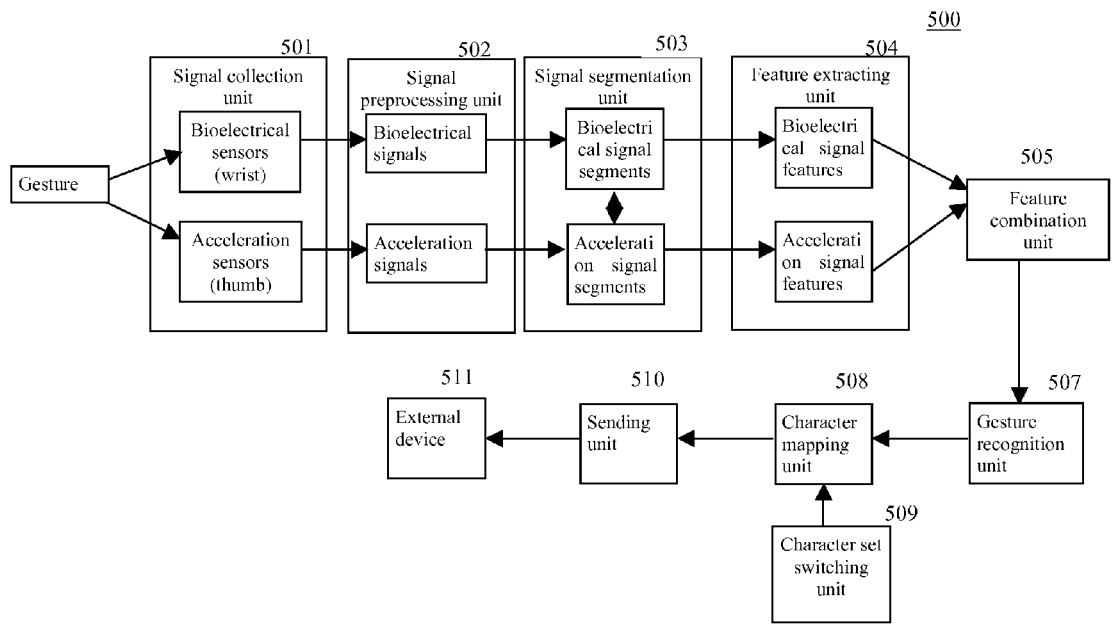
FIG. 5 illustrates schematic structure of a virtual input device according to still another embodiment of the present invention.

FIG. 5 illustrates schematic structure of a virtual input device according to still another embodiment of the present invention, which is designed to serve as a virtual keyboard.

As shown in FIG. 5, the virtual input device 500 serving as a virtual keyboard includes a signal collection unit 501, a signal preprocessing unit 502, a signal segmentation unit 503, a feature extracting unit 504, a feature combination unit 505, a signature recognition unit 507 and a character mapping unit 508.

Figure 6:
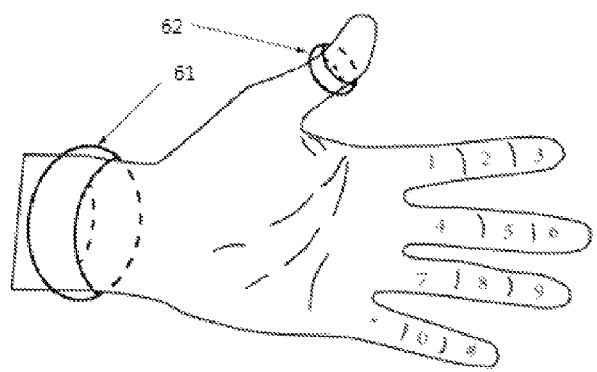
FIG. 6 illustrates a virtual keyboard according to the embodiment shown in FIG. 5.

The signal collection unit 501 includes a bioelectrical sensor disposed inside a wrist band 61 and an acceleration sensor disposed inside a thumb ring 62 as shown in FIG. 6. The bioelectrical sensor collects bioelectrical signals indicating tension level of muscle groups relating to user's gestures, and the acceleration sensor collects acceleration signals indicating track and acceleration of movement of the user's thumb.

In detail, the bioelectrical sensor disposed in the wrist band 61 is used to identify gestures of hands, including fine movement of different parts of a hand, e.g., fingers, palm and wrist. The bioelectrical sensor can be placed on skin of wrist of the user, and can include a plurality of sensor probes, e.g., myoelectricity signal probes and impedance signal probes, so as to obtain bioelectrical signals of gestures, e.g., myoelectricity signals under the skin and impedance change signals of the skin surface.

The acceleration sensor disposed in the thumb ring 62 is used to collect movement track of the user's thumb in the three-dimensional space, as well as liner displacement acceleration and angular displacement acceleration in each of the three axes, i.e., X, Y and Z. The acceleration sensor is used to identify large-scale movements, for example movements of the arm of the user.

Since the bioelectrical sensor and the acceleration sensor have their own advantages, use of both the two kinds of sensors can improve accuracy of gesture recognition greatly and can recognize fine difference between different gestures.

The signal preprocessing unit 502 performs preprocessing for the bioelectrical signals and the acceleration signals collected by the signal collection unit 501.

In detail, the signal preprocessing unit 502 performs band-pass filtering for the bioelectrical signals, and performs low pass filtering for the acceleration signals, so as to eliminate the effects of environmental noise and other factors. Then the bioelectrical signals and the acceleration signals are performed analog to digital conversion with 500-1000 Hz as sampling rate, so as to obtain discrete digital bioelectrical signals and digital acceleration signals, i.e., preprocessed bioelectrical signals and acceleration signals.

The signal segmentation unit 503 performs segmentation processing for the preprocessed bioelectrical signals and the acceleration signals so as to obtain a plurality of gesture segments.

In detail, for preprocessed bioelectrical signals, a baseline is obtained by using a multiple point moving average filter. Steady signals without low frequency drift are obtained by subtracting the baseline from the original preprocessed signals. Then inside window energy of the steady signals is obtained by using a time window having a fixed width. Thereafter, the energy magnitudes are normalized, i.e. the absolute values of the signals are changed to relative values between 0-1. A threshold is set. If there are a plurality of continuous sampling points of the signal energy which is above this threshold, a starting point of a gesture segment can be determined. And if there are a plurality of continuous sampling points of the signal energy which is below this threshold, an ending point of the gesture segment can be determined. By determining the starting point and the ending point, a gesture segment can be obtained.

For preprocessed acceleration signals, a starting point and an ending point are determined in a manner similar to the above-mentioned manner for the bioelectrical signals. Then, the two starting points and the two ending points are compared and averaged respectively, so as to complete division of gesture active segments.

The feature extracting unit 504 extracts feature values from the bioelectrical signals and the acceleration signals for respective gesture segments.

In detail, for the bioelectrical signals, each sensor probe in the bioelectrical sensor, e.g., myoelectricity signal probes and impedance signal probes, detects different types of sensor signals. Absolute values of all sampling points in a gesture active segment are averaged for each sensor probe, so as to obtain multiple average values. The multiple average values form a multi-dimensional vector which serves as feature vector of the bioelectrical signals.

In the above-described embodiment, the absolute values of all sampling points are averaged. However, this invention is not limited thereto. For example, the absolute values of all sampling points can be taken mean square root so as to obtain multiple mean square root values which then form the multi-dimensional vector.

For acceleration signals, since different movement tracks and different acceleration in each of three axes will be formed when the thumb contacts different fingers or different parts of a same finger, combination of amplitude average values of acceleration in three axes can reflect which part of which finger the thumb is moving toward. Meanwhile, standard deviation of resultant acceleration of the acceleration in the three axes can reflect level of violence of the gesture. Thus amplitude average values of acceleration in three axes plus the resultant acceleration form a four-dimensional vector which serves as feature value of the acceleration signals.

The feature combination unit 505 combines feature values, i.e., the multi-dimensional vector feature for the bioelectrical signals and the four-dimensional vector for the acceleration signals, extracted from the feature extracting unit 504, so as to obtain a combined feature vector. The multi-dimensional vector for the bioelectrical signals reflects fine movements of the hand, and the four-dimensional vector for the acceleration signals reflects the movement tracks of fingers. Thus combination of the two vectors can reflect which part of which finger is contacted by the thumb.

The gesture recognition unit 507 performs gesture recognition based on the combined feature vector, so as to recognize the gesture of the user.

In detail, the combined feature vector is inputted to a predetermined gesture recognition model, so as to recognize the gesture of the user. The gesture recognition model uses the gesture feature to establish a training model. The combined gesture feature is inputted to a classifier to perform training and recognition. Here, the training can be performed with existing methods, e.g., supervised training methods, or unsupervised training methods, or mode recognition methods such as neural networks, support vector machines and fuzzy recognition etc. Considering computing overhead and system power consumption of mobile devices, a simple linear discriminant classifier can be used to establish gesture recognition models, to facilitate the following gesture recognition.

The character mapping unit 508 obtains characters corresponding to the recognized gesture of the user according to a predetermined mapping relationship between characters and the recognized gesture result.

Here, the mapping relationship between characters and recognized gesture result can be a mapping relationship between characters and different parts of four fingers except the thumb. As shown in FIG. 6, the three parts of the forefinger indicates 1, 2 and 3 respectively, the three parts of the middle finger indicates 4, 5 and 6 respectively, the three parts of the fourth finger indicates 7, 8 and 9 respectively, and the three parts of the little finger indicates "*", 0 and "#" respectively. Thus if it is recognized that the thumb contacts the middle part of the forefinger, number "2" will be regarded as the user's input.

Since only twelve characters can be inputted according to the above-mentioned embodiment, it is not enough for character input. In order to address this issue, preferably, a character set switching unit 509 which is connected to the character mapping unit 508 is further included. Similar to soft keyboard function included in some inputting methods for personal computers, the character set switching unit 509 can switch the user's input to another set of characters. For example, under the condition that the character set switching unit 509 is activated, when the thumb contacts the middle part of the forefinger, "b" instead of "2" will be sent as the user's input.

The virtual input device 500 may further comprise a sending unit 510. The sending unit 510 may send the characters corresponding to the recognized gesture of the user to an external device 511 through a wireless communication method, such as Bluetooth or WIFI, so as to realize virtual input of characters.

With this virtual input device, signals are collected by two sensors respectively disposed inside a wrist band and a thumb ring, virtual keyboard inputting can be realized, without the need of light projection and cameras, which provides both portability and usability.

A virtual input method according to an embodiment of the present invention is described below with reference to FIG. 7.

Figure 7:
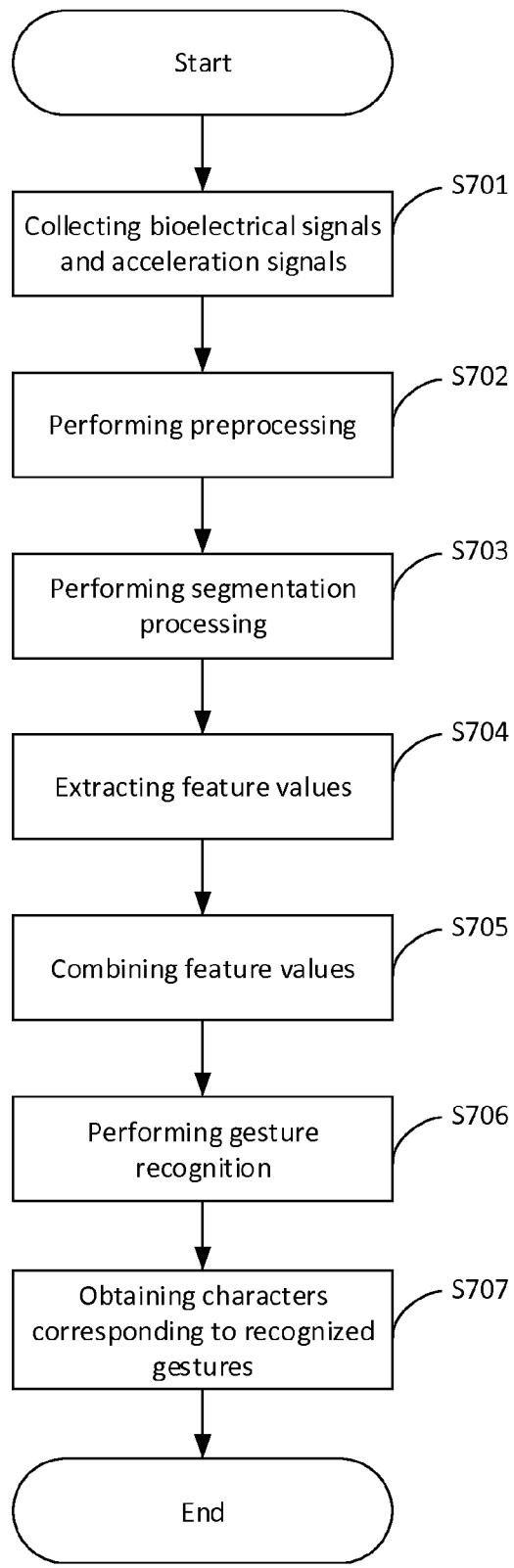
FIG. 7 is a flowchart of a virtual input method according to an embodiment of the present invention.

As shown in FIG. 7, at step S701, bioelectrical signals and acceleration signals are collected. Here, the bioelectrical signals indicate tension level of muscle groups relating to a user's gesture, and the acceleration signals indicate track and acceleration of movement of the user's thumb. In an embodiment, the bioelectrical signals and the acceleration signals are collected via a bioelectrical sensor disposed inside a wrist band and an acceleration sensor disposed inside a thumb ring respectively.

The bioelectrical signals may include myoelectricity signals indicating bioelectrical information under the skin and impedance change signals indicating bioelectrical information of the skin surface. In an embodiment, the bioelectrical signals reflect gestures of hands, for example whether the thumb is contacted with or separated from one of the other four fingers, e.g., forefinger which will be taken an example thereinafter. In another embodiment, the bioelectrical signals reflect fine movement of different parts of a hand, e.g., fingers, palm and wrist.

The acceleration signals reflect movement track of the user's thumb in the three-dimensional space, as well as liner displacement acceleration and angular displacement acceleration in each of the three axes, i.e., X, Y and Z. In an embodiment, the acceleration sensor may reflect contacting time between the thumb and the forefinger. For a short contact, the speed change of the thumb in three axes is large, and in contrast, for a long contact, the speed change of the thumb in three axes is small. So by collecting acceleration of the thumb in three axes, whether the contact between the thumb and the forefinger is a long contact or a short contact can be determined. In another embodiment, the acceleration signals reflect large-scale movements, for example movements of the arm of the user.

At step S702, preprocessing is performed for the bioelectrical signals and the acceleration signals. For example, the preprocessing includes noise deduction processing, filtering processing and analog to digital conversion.

In detail, band-pass filtering is performed for the bioelectrical signals, and low pass filtering is performed for the acceleration signals, so that the effects of environmental noise and other factors are eliminated. Then the bioelectrical signals and the acceleration signals are performed analog to digital conversion with 500-1000 Hz as sampling rate, so that discrete digital bioelectrical signals and digital acceleration signals, i.e., preprocessed bioelectrical signals and acceleration signals, are obtained.

At step S703, segmentation processing is performed for the preprocessed bioelectrical signals and acceleration signals so as to obtain a plurality of gesture segments.

In detail, for preprocessed bioelectrical signals, a baseline is obtained by using a multiple point moving average filter. Steady signals without low frequency drift are obtained by subtracting the baseline from the original preprocessed signals. Then inside window energy of the steady signals is obtained by using a time window having a fixed width. Thereafter, the energy magnitudes are normalized, i.e. the absolute values of the signals are changed to relative values between 0-1. A threshold is set. If there are a plurality of continuous sampling points of the signal energy which is above this threshold, a starting point of a gesture segment can be determined. And if there are a plurality of continuous sampling points of the signal energy which is below this threshold, an ending point of the gesture segment can be determined. Through determining the starting point and the ending point, a gesture segment can be obtained.

For preprocessed acceleration signals, a starting point and an ending point are determined in a manner similar to the above-mentioned manner for the bioelectrical signals. Then, the two starting points and the two ending points are compared and averaged respectively, so as to complete division of gesture active segments.

At step S704, feature values are extracted from the bioelectrical signals and the acceleration signals for respective gesture segments.

In detail, for the bioelectrical signals, absolute values of all sampling points in a gesture active segment are averaged for each bioelectrical signal, so as to obtain multiple average values. The multiple average values form a multi-dimensional vector which serves as feature vector of the bioelectrical signals.

In the above-described embodiment, the absolute values of all sampling points are averaged. However, this invention is not limited thereto. For example, the absolute values of all sampling points can be taken mean square root so as to obtain multiple mean square root values which then form the multi-dimensional vector.

For acceleration signal, in an embodiment, speed changes in the three axes X, Y and Z are calculated to obtain a three-dimensional acceleration feature vector. When the thumb contacts different fingers or different parts of a same finger, the space movement tracks and acceleration in the three axes of the thumb are different, so the contacting time between the thumb and the forefinger can be determined by identifying the acceleration in the three axes of the thumb. For example, the acceleration is relatively large for a short contact while it is relatively small for a long contact. In another embodiment, standard deviation of resultant acceleration of the acceleration in the three axes which can reflect level of violence of the gesture is further included so that a four-dimensional vector is formed as feature value of the acceleration signals.

At step S705, feature values extracted from the bioelectrical signals and the acceleration signals are combined. That is, the multi-dimensional feature vector obtained for the bioelectrical signals and the three-dimensional feature value or the four-dimensional feature vector obtained for the acceleration signals are combined.

At step S706, gesture recognition is performed based on the combined feature vector, so as to recognize the gesture of the user.

In detail, in an embodiment, based on the combined feature vector, whether the thumb contacted with or separated from the forefinger is judged according to the bioelectrical feature vector, and contacting time between the thumb and the forefinger is determined according to the acceleration feature vector. Large acceleration which means short contact, small acceleration which means long contact, and separation of the thumb from the forefinger corresponds to short code, long code and space key of the Morse codes respectively. Thus with this embodiment, Morse codes can be inputted virtually.

In another embodiment, the combined feature vector is inputted to a predetermined gesture recognition model, so as to recognize the gesture of the user. The gesture recognition model uses the gesture feature to establish a training model. The combined gesture feature is inputted to a classifier to perform training and recognition. Here, the training can be performed with existing methods, e.g., supervised training methods, or unsupervised training methods, or mode recognition methods such as neural networks, support vector machines and fuzzy recognition etc. Considering computing overhead and system power consumption of mobile devices, a simple linear discriminant classifier can be used to establish gesture recognition models, to facilitate the following gesture recognition. Thus with this embodiment, virtual keyboard can be realized.

At step S707, characters corresponding to the recognized gesture of the user are obtained according to a predetermined mapping relationship between characters and gestures. In an embodiment, the predetermined mapping relationship is a Morse code table. In another embodiment, the predetermined mapping relationship is a mapping relationship between characters and different parts of four fingers except the thumb. In the latter embodiment, a step of switching character sets can be further included to expand the number of characters corresponding to gestures.

And the method may further comprising a step of sending the characters corresponding to the recognized gesture of the user to an external device through a wireless communication method, such as Bluetooth or WIFI, so as to realize virtual input of characters, for example Morse codes or common characters.

It should be understood that the embodiments described herein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims and their equivalents.

What is claimed is:

1. A virtual inputting device, comprising:
    a signal collection unit including a bioelectrical sensor for collecting bioelectrical signals and an acceleration sensor for collecting acceleration signals, the bioelectrical signals and the acceleration signals reflecting a user's gesture;
    a signal preprocessing unit for performing preprocessing for the bioelectrical signals and the acceleration signals collected by the signal collection unit;
    a signal segmentation unit for performing segmentation processing for the preprocessed bioelectrical signals and acceleration signals so as to obtain a plurality of gesture segments;
    a feature extracting unit for extracting feature values from the bioelectrical signals and the acceleration signals for respective gesture segments;
    a feature combination unit for combining feature values extracted from the feature extracting unit to form a combined feature vector;
    a gesture recognition unit for performing gesture recognition based on the combined feature vector; and
    a character mapping unit for obtaining characters corresponding to the recognized gesture according to a predetermined mapping relationship between characters and gestures,
    wherein the segmentation processing comprises:
    determining starting points and ending points for the preprocessed bioelectrical signals and the preprocessed acceleration signals respectively; and
    averaging the starting points so as to obtain a starting point of a gesture segment, and averaging the ending points so as to obtain an ending point of the gesture segment.

2. The virtual input device of claim 1, further comprising a sending unit for sending the characters corresponding to the recognized gesture to an external device.

3. The virtual input device of claim 2, wherein the sending unit sends the characters corresponding to the recognized gesture to the external device using a wireless communication method.

4. The virtual input device of claim 1, wherein the bioelectrical sensor is disposed inside a wrist band, and the acceleration sensor is disposed in a thumb ring.

5. The virtual input device of claim 1, wherein the bioelectrical sensor comprises a plurality of myoelectricity signal probes and a plurality of impedance signal probes.

6. The virtual input device of claim 1, wherein the preprocessing comprises band-pass filtering for the bioelectrical signals, low pass filtering for the acceleration signals, and analog to digital conversion for the bioelectrical signals and the acceleration signals.

7. The virtual input device of claim 1, wherein determining starting points and ending points comprises:
    obtaining a baseline using a multiple point moving average filter;
    subtracting the baseline from the original preprocessed signals to obtain steady signals;

obtaining inside window energy of the steady signals using a time window having a fixed width;

normalizing energy magnitudes;

comparing the normalized energy magnitudes with a predefined threshold; and determining the staring points and the ending points based on comparing result.

8. The virtual input device of claim 1, wherein the feature extracting unit combines multi-channel bioelectrical signals to form a multi-dimensional feature vector, and calculates speed changes in each axis of a three-dimensional space for the acceleration signals to form a three-dimensional feature vector; and wherein the feature combination unit combines the multi-dimensional feature vector and the three-dimensional feature vector to form the combined feature vector.

9. The virtual input device of claim 1, wherein the feature extracting unit combines multi-channel bioelectrical signals to form a multi-dimensional feature vector, and calculates amplitude average values of acceleration in each axis of a three-dimensional space plus resultant acceleration for the acceleration signals to form a four-dimensional feature vector; and wherein the feature combination unit combines the multi-dimensional feature vector and the four-dimensional feature vector to form the combined feature vector.

10. The virtual input device of claim 1, wherein the mapping relationship between characters and recognized gesture result is a Morse code table.

11. The virtual input device of claim 1, wherein the mapping relationship between characters and recognized gesture result is a mapping relationship between characters and different parts of four fingers except thumb.

12. The virtual input device of claim 11, further comprising a character set switching unit for switching the recognized gesture to another set of characters.

13. A virtual inputting method, comprising:

collecting bioelectrical signals and acceleration signals reflecting a user's gesture;

performing preprocessing for the collected bioelectrical signals and the collected acceleration signals;

performing segmentation processing for the preprocessed bioelectrical signals and the preprocessed acceleration signals so as to obtain a plurality of gesture segments;

extracting feature values from the bioelectrical signals and the acceleration signals for respective gesture segments;

combining the extracted feature values to form a combined feature vector;

performing gesture recognition based on the combined feature vector; and obtaining characters corresponding to the recognized gesture according to a predetermined mapping relationship between characters and gestures, wherein the segmentation processing comprises:

determining starting points and ending points for the preprocessed bioelectrical signals and the preprocessed acceleration signals respectively; and averaging the starting points so as to obtain a starting point of a gesture segment, and averaging the ending points so as to obtain an ending point of the gesture segment.

14. The method of claim 13, further comprising sending the characters corresponding to the recognized gesture to an external device.

15. The method of claim 14, wherein a wireless communication method is used to send the characters corresponding to the recognized gesture to the external device.

16. The method of claim 13, wherein the bioelectrical signals comprise a plurality of myoelectricity signals and a plurality of impedance signals.

17. The method of claim 13, wherein the mapping relationship between characters and recognized gesture result is a Morse code table.

18. The method of claim 13, wherein the mapping relationship between characters and recognized gesture result is a mapping relationship between characters and different parts of four fingers except thumb.

19. The method of claim 18, further comprising switching the recognized gesture to another set of characters.

\* \* \* \* \*